United States Patent [19]

Odom, Jr.

[11] Patent Number: 5,016,389
[45] Date of Patent: May 21, 1991

[54] METHOD AND APPARATUS FOR SUPPLY OF WATER AND NUTRIENTS TO PLANTS

[76] Inventor: Harold A. Odom, Jr., 2318 Masters La., Missouri City, Tex. 77459

[21] Appl. No.: 335,760

[22] Filed: Apr. 10, 1989

[51] Int. Cl.$^5$ ............................................. A01G 27/00
[52] U.S. Cl. ........................................ 47/48.5; 47/40.5
[58] Field of Search .................. 220/235, 234, 238; 47/48.5, 52, 57.5, 40.5, 79

[56] References Cited

U.S. PATENT DOCUMENTS

| | | | |
|---|---|---|---|
| 447,668 | 3/1891 | Duryee | 47/57.5 |
| 922,544 | 5/1909 | Turner | 220/235 X |
| 1,756,453 | 4/1930 | Davey | 47/57.5 |
| 1,982,975 | 12/1934 | Aiken | 47/57.5 |
| 1,993,307 | 3/1935 | Nicholson | 220/235 X |
| 2,493,452 | 1/1950 | Grigg | 220/235 X |
| 2,905,355 | 1/1959 | Orser | 220/235 |
| 3,992,813 | 11/1976 | Freshel | 47/57.5 |
| 4,505,067 | 3/1985 | Gillespie | 47/57.5 |
| 4,651,468 | 3/1987 | Martinez et al. | 47/48.5 X |
| 4,884,365 | 12/1989 | Lesquir | 47/52 |

Primary Examiner—Richard E. Chilcot, Jr.
Assistant Examiner—Michele A. Van Patten
Attorney, Agent, or Firm—Matthews & Assoc.

[57] ABSTRACT

A method and apparatus for supplying fluids and nutrients to trees or plants through a hole bored in the trunk or stem. The method and apparatus also apply to trees severed from their root system, for example, Christmas trees. The apparatus includes a nozzle equipped for insertion into the bore and for sealing connection into and within the bore. The nozzle is attached to a fluid conduit which in turn is connected to a leak resistant, self priming fluid reservoir. A microporous filter is interposed between the fluid and the nozzle.

11 Claims, 3 Drawing Sheets

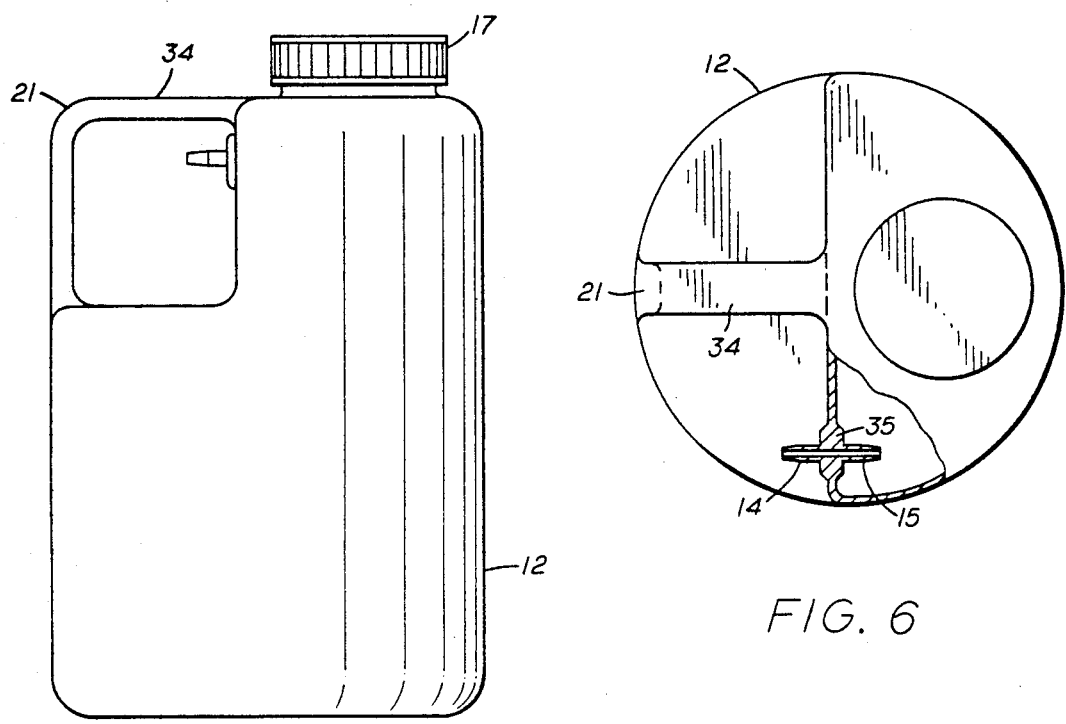
FIG. 5
FIG. 6
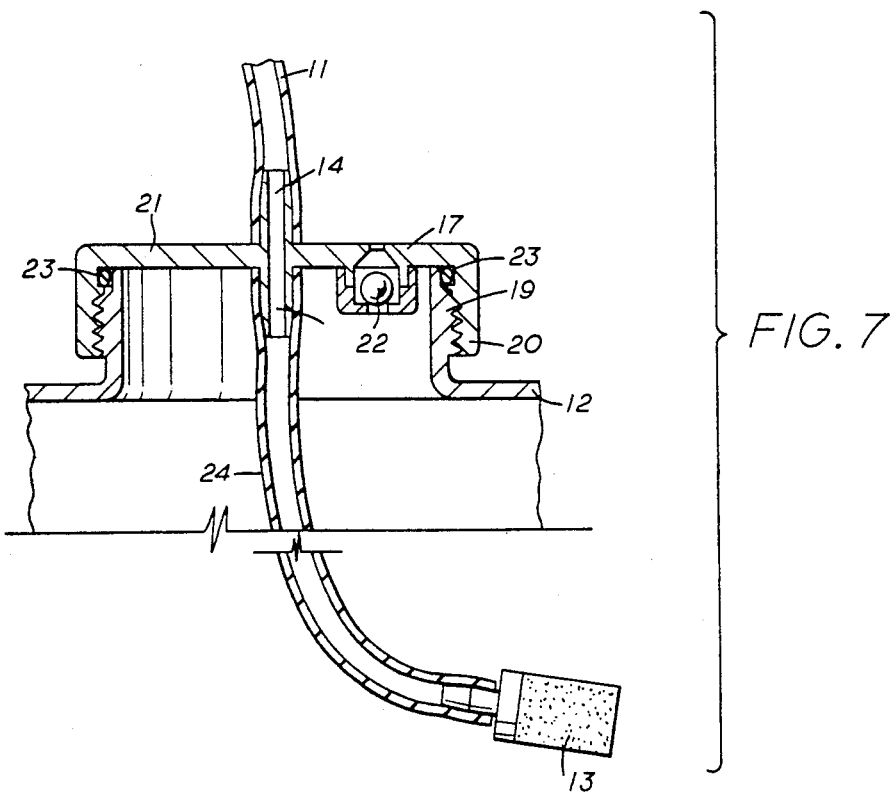
FIG. 7

METHOD AND APPARATUS FOR SUPPLY OF WATER AND NUTRIENTS TO PLANTS

BACKGROUND AND SUMMARY OF INVENTION

This invention relates in general to a watering and nutrient supply device for plants. More specifically, this device relates to an apparatus for supplying water and nutrients to a plant or tree that has been severed from its root system. In particular, this device applies to supplying water and nutrients to Christmas trees.

The prior art is repleat with examples of methods and apparatus for supplying water and nutrients to Christmas trees. Although an important factor for the existence of such an apparatus is cosmetic, due to the desire of people to maintain the appearance of a living tree, as in the instance of Christmas trees, a primary, and most important, feature of the present invention is to reduce the combustibility of natural trees utilized as Christmas trees. This is particularly important when one considers that virtually all Christmas trees have electric lights hung upon them.

Various prior art inventions of interest are as follows: U.S. Pat. No. 3,505,760 to Ambrose, a watering device specifically adapted to Christmas trees. This device is a rudimentary funnel which is adapted to facilitate the process of supplying water to the tray incorporated within a common Christmas tree stand. The Ambrose device is merely illustrative of one specific application within the general field covered by the present invention.

U.S. Pat. No. 3,137,969 to Sokol, for an automatic water dispenser for a tree, illustrates a variation on the common Christmas tree stand and tray referred to in the previous paragraph. The Sokol device is specifically applicable to Christmas trees, and addresses the need for supplying water for up to a two week period of time from a supply tank incorporated into the common Christmas tree stand, without the necessity for frequent fillings of the tray within the Christmas tree stand throughout the Christmas season. The Sokol device does not address situations where it is, or might be, desired to maintain plant life longer than 2 weeks throughout a Christmas Season, and exhibits nothing in the way of improvements in introduction of fluids and nutrients to a plant over the standard Christmas tree tray and stand.

U.S. Pat. No. 2,938,304 to Thomas et. al, again is specifically adapted to a means for watering Christmas trees. The Thomas device illustrates two embodiments which again are mere variations on a common, standard Christmas stand and water tray. The variations include a remote funnel and a fluid conduit extending from the funnel to the tray. One embodiment of the Thomas device utilizes sharp edges on the tray incorporated within the common stand. The sharp edges which are driven into the bottom of the trunk of the Christmas tree to provide a seal, and the remote funnel and fluid line is located above the location of the stand to provide for a gravity feed, or actually, a pressure feed, due to the hydrostatic pressure of the head of the funnel above the stand. A second embodiment of the Thomas device utilizes a similar hydrostatic head provided by the funnel located above the water tray incorporated within the stand, but the sealing provision of the second Thomas embodiment is provided by a funnel shaped rubber member disposed within the water tray located on the stand itself. Neither of the embodiments illustrated by Thomas could be utilized for a plant which has not been severed from its root system, as could the apparatus of the present invention.

The Kleckner device, U.S. Pat. No. 1,240,713 illustrates a device for applying a fluid substance to the surface of a plant, rather than a device for introduction of a fluid substance into the sap carrying capillaries within the inner layer of a plant. In addition, the Kleckner device operates by means of increasing atmospheric pressure within the container through the use of an air pump, after the matter of an atomizer.

U.S. Pat. No. 1,756,453 to Davey et. al, illustrates a method of treating trees, and apparatus therefore, which illustrates a means for introducing the chemicals into a living tree through a boring in a tree trunk by means of a pressure injection pump. Davey specifically teaches an "improvement over gravity feed process with pressures, which not only equal the hydrostatic pressure in the tree, but which may be made to greatly exceed those hydrostatic pressures and speed up the rate of injection." The method of Applicant's invention in contrast utilizes the natural hydrostatic pressures of a living plant to drive the fluid flow process. In addition, the present invention provides a much improved sealing mechanism over that of the Davey reference.

U.S. Pat. No. 1,805,550 to Lipman et. al, is directed to a method of production of a wood product, and not to a method of preserving the life and appearance of a living plant severed from its root system. The Lipman reference does illustrate a feed injection apparatus for introduction of fluids into the sap flow of a tree for distribution throughout the cellular structure of the tree by sap circulation. However, as with the Davey reference previously described, the present invention provides an improved connection of the injection apparatus to a tree, which is desirable where a plant is desired to be sustained alive indefinitely in contrast to the Lipman apparatus where a simple short term distribution of toxics throughout a tree prior to its harvest is the goal.

The Martinez Patent, U.S. Pat. No. 4,651,468 teaches a method and apparatus for natural fertilization and irrigation of plants, which can broadly be applied to the several fields to which the present invention is applicable. A particular problem with the Martinez device is that the microporous (ceramic) insert nozzle can become blocked, clogged by impurities, sediments, or precipitates. The nozzle is glued or sealed in and cannot be back flushed. The apparatus of the present invention describes a much improved reusable connection apparatus, seal, and method.

In summary, it is apparent that none of the prior art references equals the apparatus and method of the present invention for supplying water and nutrients to a living plant, and for maintaining the life and appearance of a living plant which has been severed from its root system.

SUMMARY OF THE INVENTION

The focus of the present invention is to provide a new and improved method for supplying water and other nutrients to a tree or plant, which has been removed from its natural root system. It is to be understood, however, that the present invention is equally useful for supplying water and nutrients to plants in situ. Unless a distinction is specifically made, any following reference to a plant should be understood to apply equally to trees, and any reference to trees applies also to plants.

One typical application for the present invention would be as a means of feeding and watering a Christmas tree both during the season, and further to prolong the life of the tree before and/or after the season.

The present invention provides an improved connection and sealing injection element for insertion into and sealing within, an opening or hole bored through the outer layers of a plant or tree into the sap carrying capillaries. The injection nozzle is connected by a fluid carrying tube or conduit to a supply tank or reservoir which can be filled with several days or even weeks supply of fluids and nutrients. The reservoir can be marked to facilitate maintaining the fluid level within an acceptable range to prevent the reservoir from going dry. A microporous filter is placed in-line between the fluid reservoir and the injection apparatus so that any solid particles in the fluid reservoir do not block the sap carrying capillaries of the plant.

Objects of the present invention are to provide a reusable long lasting method of attachment, to minimize inconvenience, and to deliver nutrient carrying liquid to the capillaries of a plant through a nozzle which is provided with reusable mechanical seal which prevents leakage of the sticky sap or other natural substances out of the hole bored within the plant onto carpeting, flooring, or other surfaces. In addition, the present invention will provide a relatively safe and leak proof seal at the point of insertion into the tree. This is important when one considers that the nutrient carrying fluid may be a good conductor of electricity, and further, when one considers that one specific application for the present invention would be to Christmas trees, which commonly are provided with electrical ornaments.

In addition, the present invention provides a method of attachment which can be adjusted to accommodate plants of differing trunk or stem diameters by allowing positioning of the delivery tip of the nozzle into the area of the sap wood, while allowing the rubber bushing which seal the point entry to be kept at that point by use of interchangeable compression sleeves. This attachment method will be made of materials which will resist the effects of corrosion, rust, and other deteriorations, and therefore will have an enhanced life span and reduced maintenance, and thereby a low cost operation over several seasons.

Moreover, the device of the present invention is not dependent upon precision boring of the aperture into the tree trunk or plant stem, and requires no sealants or glues for a leak proof seal.

Further, the present invention provides a microporous filter element to prevent the capillaries within the central area of the tree from being clogged with solid particles commonly found in available water sources. The central portions of the tree are concentrations of very fine capillaries through which liquid travels, and any clogging would restrict fluid flow reducing the life span of the tree or plant by inhibiting access to the intended value of the liquid in the case of a plant not severed from its root system and in the case of a tree or plant severed from its root system depriving it of the needed liquid to prolong life and freshness.

A further advantage presented by the present invention is that the device is not dependent on, or integral to, any mechanism serving as a stand to hold the tree, and therefore can be used with any type of common tree stand. The present invention will greatly reduce the amount of attention needed to maintain sufficient water levels during the time a Christmas tree is displayed during the Christmas season.

A further advantage presented by the present invention is a reduction of the possibility of damage to carpet and flooring and furniture from spilling the water and chemicals during filling and during removal of the tree and stand at the end of the season.

A further advantage presented by the present invention, and an object thereof, is that any chemicals or nutrients that are desired to be added to prolong the life of a living plant, or to enhance the moisture retentiveness of a plant, can be sealed within a closed system, and thereby the safety of the system is enhanced. Small children, pets, or others, who might be in proximity to a Christmas tree will be protected from exposure to such chemicals.

The described and other objects and features of the invention will be pointed out with more particularity in the claims and following portions of the specification. For better understanding of the invention, its advantages and specific objects attained by uses, reference should now be had to the accompanying drawings, illustrations and descriptive matter, in which are illustrated preferred embodiments of the invention.

In summary, this invention provides a device wherein all parts are corrosion, rust and otherwise chemically resistant, and resistant to wear. The device is reusable indefinitely with minimum care and is designed such that all needed parts can be stored inside reservoir and put away until next use. The filter can be easily backflushed for cleaning. The liquid reservoir is sealed self righting and thus leak resistant even if tipped over, and tree will continue to drink even if the reservoir is accidentally tipped over. Additives can be easily mixed in reservoir container safely and accurately at sink. Additives are safely enclosed from pets and small children as opposed to conventional stands. The filter prevents clogging of the inner capillaries of the tree with trash from household water source or solid particles in chemicals. The liquid does not promote mildew and algae that's common to bowl type stands when organic products are inserted to water and left for extended periods of time. The only tool required to attach device is a drill (either electric or hand) with $\frac{1}{4}''$ bit for wood. No precision boring is required —that is the $\frac{1}{4}''$ hole not does not need to be perfectly smooth and it is intended that the user would drill through completely cross-section in the middle of trunk below last row of branches at bottom negating any need to control the depth of the bore. The device comes complete, shipped with all parts contained in liquid reservoir (container).

Benefits of the device include that freshness and aroma of the tree is prolonged in house throughout the season; danger of fire normally associated with dried out tree is reduced; the water level easily monitored through translucent reservoir which eliminates need for crawling under tree, or sticking finger in stand/bowl to check water level; the device can be used with any type of stand (i.e., wood, metal or no stand.); and, the device eliminates blind pouring of water which may overflow. At the end of the season when taking tree down instead of spilling mildewed standing water onto valuable carpeting and flooring, the present device disconnects easily for storage. Further, the reservoir can be disguised as gift wrapped present and easily removed for refilling as need, and all instructions necessary are permanently affixed to the reservoir as part of the label.

BRIEF DESCRIPTION OF THE DRAWINGS

The foregoing features and other below described aspects of the invention will be explained in greater detail when the following description is read and taken in conjunction with the accompanying drawings, wherein:

FIG. 5 is an elevational view of the fluid reservoir of the apparatus of the present invention.

FIG. 6 is a plan view and partial cutaway of the reservoir of FIG. 5.

FIG. 7 is a cross section through an alternative reservoir and through the pickup tube.

DETAILED DESCRIPTION OF THE PREFERRED EMBODIMENTS

Figure 1:
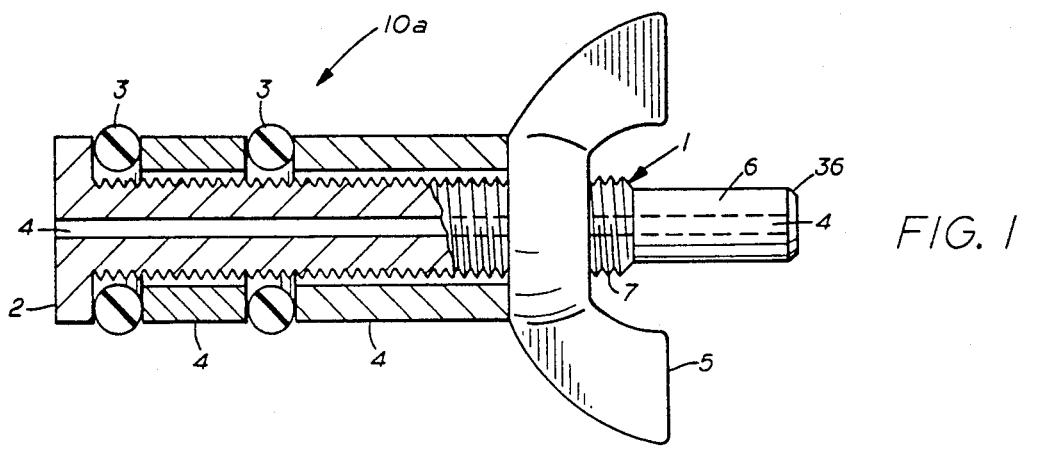
FIG. 1 is a cross section through a first embodiment of the injection nozzle of the plant feed apparatus of the present invention.
Figure 2:
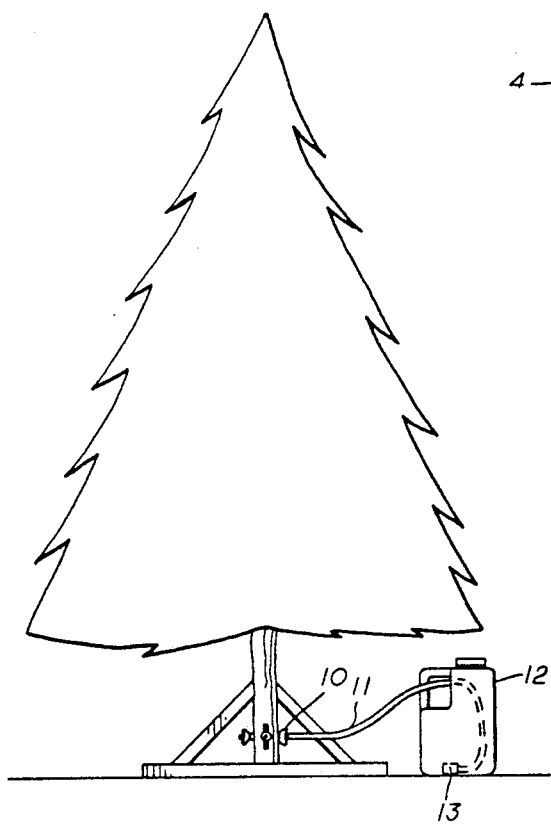
FIG. 2 is an elevational view depicting the use of the complete apparatus of the present invention with a Christmas tree and common stand.

With reference now to the drawings, in particular to FIGS. 1 and 2, the new and improved apparatus utilizable in conjunction with the method of the present invention will be described.

In this respect the apparatus comprises a sealing injection nozzle 10, a fluid transport tube or conduit 11, a fluid reservoir 12, and a microporous filter element 13. As may be appreciated by a study of FIGS. 1, 3, and 8, there are alternate embodiments of the injection nozzle 10, which are referred to respectively as 10(a), 10(b) and 10(c).

Referring to FIG. 1, there is depicted in cross section a first embodiment of the sealing injection nozzle 10 of the present invention. The various components of the sealing injection nozzle 10(a) depicted in FIG. 1 are as follows: a hollow shank bolt 1, which comprises a delivery tip head 2, a smooth shaft section 6, and a threaded shaft section 7. The proportions and arrangement of these components will be further described below.

Also depicted in FIG. 1 are the following components of the sealing injection nozzle 1(a): two similar bushings 3 and two compression sleeves 4 for a wing nut 5. The bushings should be made of an elastomatic material relatively more compressible than the compression sleeves. Both the bushings 3 and compression sleeves 4 should be manufactured from some corrosion resistant material which is water impermeable. Suitable materials would be rubber O-rings for the bushings 3 and nylon for the compression sleeves 4, although many alternative materials would suggest themselves to those of ordinary skill in the art.

The sealing injection nozzle 10 is formed of a primary component, hollow shank bolt 1. The function of the passage 14 through the longitudinal axis of the bolt 1 will be further described below. The bolt 1 can be of nylon, polypropelene or other such corrosion resistant material. This wing nut 5, also should be manufactured from corrosion resistant material. Nylon, polypropelene or equivalents would be as appropriate for the wing nut 5 as the bolt 1, although a standard metal wing nut could be used. This injection nozzle 10a will be inserted into a hole 35 bored within and through various layers of a plant as will be described below in more detail. The threadless smooth shank section 6 provides a means for interconnection with a transport tube, or fluid conduit 11, which can be seen in FIGS. 2 and 3. The remaining shaft section 7 in conjunction with the two compression sleeves 4, and two bushings 3 provide a means for both varying the depth of insertion into a plant, and means for radial expansion, so as to seal the opening made into the plant. In general, the layers of plant tissue, in a tree trunk, from inner to outer, are the xylem 26, the cambium 27, the inner bark or phloem 28, and the outer bark or cork 29. See FIG. 4. The bark 29 is relatively impervious to water, capillaries comprising the phloem 28 carry products synthesized by the tree leaves down to other parts of the tree, while capillaries within the xylem 26 carry water and nutrients from the roots, or in this situation from the present invention, up to the leaves. The hole 14 through the shank of the bolt provides a fluid passage into the inner capillary sap carrying portions 26 of a plant.

This general discussion set the stage for an understanding of the use of the multiple bushings 3 and compression sleeves 4 (of different lengths). As will be described further below, by interchanging compression sleeves 4 of varying lengths, it would be possible to control which layers of a plant the fluid will flow to, regardless of the depth of the of the hole.

Figure 3:
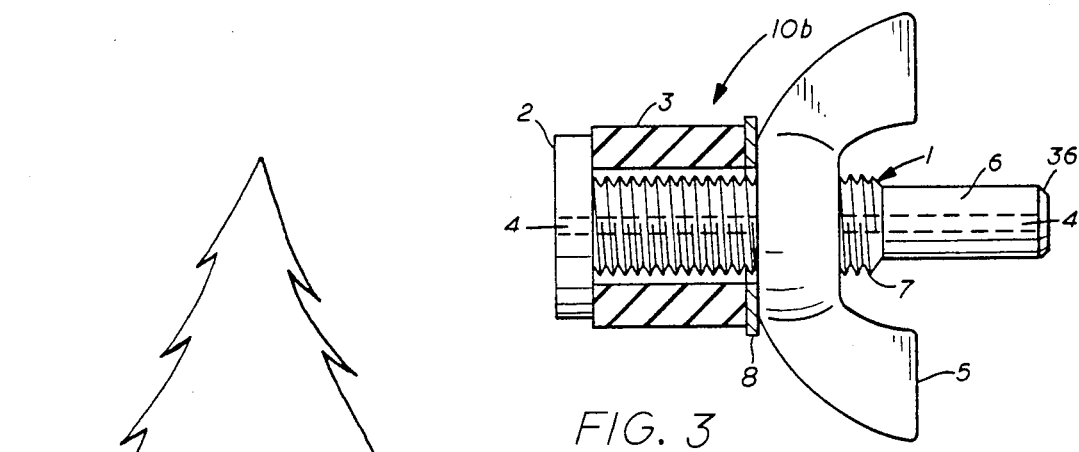
FIG. 3 is a cross section through an alternative embodiment of the injection nozzle of the invention.
Figure 4:
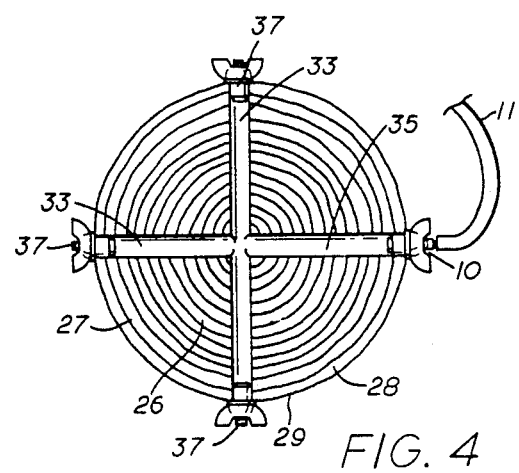
FIG. 4 is a plan view through a section of a plant with the injection nozzle installed.

As can be readily understood by viewing FIGS. 1 and 3, the hollow shank bolt 1, compression sleeve 4, bushing 3, wing nut 5, are assembled loosely in combination, which is inserted into a bore 35 made into a plant. When the wing nut 5 is tightened down it compresses the bushing 3 between the head of the bolt 1 at the delivery tip 1, the sleeves 4, and the wing nut 5. The bushings will expand circumferencially to seal against the inner wall of the cylindrical bore made into the plant. The smooth shaft section 6, provided at the outer end of the injection nozzle 10, then provides a surface and configuration readily adaptable for sealing connection to a fluid transport member or conduit 11 as depicted in FIGS. 2 and 4.

The injection nozzle 10a depicted in FIG. 1 utilizes two rubber bushings and two compression sleeves 4. The compression sleeves 4 may be varied in length, depending upon the size and type of plant so that the bushing 3 nearest the delivery tip 2 dams off the hole in the xylem from the other and outer parts of the tree, while at the same turning of a wing nut 5 expands the second bushing 3 nearest the wing nut and thereby fills the area nearest the entry point of the tree and dams the outer connection to contain any natural substances that could leak from the Christmas tree, and to thereby prevent a loss of hydrostatic pressure, or pore pressure of the tree, by the introduction of unwanted air.

Utilizing bushings 3 of varying thicknesses and diameters and sleeves 4 of varying lengths would achieve a wide variety of applications to different plants for a single injection nozzle. This is useful because for trees of different species or of different sizes within a species the relative depths of the plant layers will vary. Providing water and nutrients only to the xylem 26 with no leakage into the phloem 28 achieves a proper condition for natural hydrostatic capillary flow of the nutrients and water into the tree.

A specific illustrative embodiment would utilize a ¼" nylon bolt with a hollow shank. Two rubber O-ring bushings with a nominal O.D. of 7/16" and two nylon compression sleeves with a nominal O.D. of 7/16" or slightly smaller, would have an inside diameters sized to just slip over the shank of the bolt. This embodiment would be used with a ¼" (nominal) bore into a tree or plant. The same bolt, wing nut, and compression sleeves would work on larger bores with appropriately sized bushings to seal the large bore. For the relatively larger bores, it would be desirable to include four flat washers (not shown) one on each side of each O-ring to step out the effective compression surface of the sleeves 4.

A second embodiment depicted in FIG. 3 illustrates only a single bushing 3 which may be fabricated from any compressible sealing material, such as plastic latex, or rubber, or the like, and a single flat washer 8. The operation of this embodiment is essentially similar to that of the embodiment depicted in FIG. 1, when the wing nut 5 is threaded onto the threaded portion of the shaft 7, and tightened against the flat washer 8, it compresses the bushing 3, which thereby expands to fill and seal the aperture made into and through the walls of a plant.

Either injection nozzle can be easily removed by loosening wing nut 5, or turning it counter-clockwise for a standard thread wing nut. This would decompress the rubber bushing 3 or bushings 3 and cause the compression sleeves 4, or flat washer 8, depending upon the embodiment, to travel away from the delivery tip head 2 and thereby cause the bushing 3 or bushings 3 to shrink and lose contact with the walls of the bore through the plant.

The delivery conduit or tubing or hosing 11 may be fabricated from any suitable substance such as plastic, acrylic or rubber tubing. Fabrication from such materials would provide an economical and efficient connection, because tubing fabricated from such materials would expand slightly when fitted over and onto the smooth shaft section 6 of the injection nozzle 10, which is provided with a beveled surface 36 to facilitate slipping the hose on the smooth shaft section 6. Thereby no further or more complicated means would be needed to provide for a fluid tight seal. If a more secure seal is required a hose clamp (not shown) would suffice.

The holding vessel 12 for the liquid supply may be any suitable container. A primary embodiment would be the soft sided translucent plastic bottle illustrated in FIGS. 2, 5 and 6. The reservoir illustrated in FIGS. 2, 5 and 6 is uniquely shaped for maximum suitability for application with the other components of the present invention. The reservoir is a standard molded shape, but not a commonly used one. Several desirable attributes result from the shape, and only a few modifications are required from the standard mold.

As illustrated, the reservoir is approximately 5/6 of a cylinder, with a contiguously molded handle 34 located in the remaining 1/6 space. FIGS. 5 and 6 best demonstrate the shape. The proportions mentioned are approximate and can be varied, but if configured as mentioned, the reservoir will be highly resistant to tipping because of its inherently stable shape, when the fluid level is below the handle level. When the fluid level is above the handle level, even if the reservoir is tipped over, it exhibits self righting properties, as will be described below, to reduce leaking possibilities.

The opening into the reservoir is approximately 110 mm in diameter. This enables one to reach a hand inside the opening. This is important for two reasons. The first is that all of the other component parts of the apparatus are stored inside the reservoir jug for shipping, and during the off season. Secondly, the jug is provided with contiguously molded outer and inner nipple connections 14 and 15 respectively for connection to the fluid conduit 11 and pick up type 24, and one must reach inside to attach the pickup tube.

As detailed in the cut away FIG. 6 the wall of the reservoir 12 presents a slightly thickened area 35 where the nipples 14, 15 are located for support. The nipples 14 and 15 are tapered or stepped to provide for easy sealing connection to tubes of varying diameters. The relatively large opening of the reservoir 12 enables one to reach inside the reservoir and attach the pick up tube 24 to the inner nipple 15. The pick up tube runs to the bottom of the reservoir 12 where the microporous filter 13 is connected.

Since the fluid flow is driven by the normal hydrostatic pressures of the living plant, a plant will continue to "drink" even if the reservoir is tipped over.

The reservoir embodiment of FIG. 5 is equipped with a threaded cap 17, for sealing threaded connection with threads 19 at the reservoir opening. The cap 17 may be equipped with a gasket 23 to insure a hermetic and fluid tight seal. The above features are illustrated in FIG. 7, which also illustrates an alternative pick up tube assembly through the cap.

Because the cap of FIGS. 5 and 6 seals, a vent 21 is required to enable proper hydrostatic flow. A simple pinhole 21 at the apex of the molded handle provides this vent. The location at the apex of the handle is desireable in the event a full, or nearly full, (more than two thirds) reservoir is overturned.

Upon this occurrence, the unique shape of the reservoir of FIGS. 5 and 6, assures that the reservoir will roll on its side until the pinhole 21 is up, and therefore reduce any possibility of leaks.

A further function of the pinhole vent 21 at the described location on the handle 34 is to serve as part of a self priming mode.

First the reservoir 12 is filled with fluid, then the supply tube 11 and pickup tube 24 with attached filter 23 are installed, then the reservoir cap 17 is screwed down to seal the opening. Then one covers the vent 21 with a thumb as the handle 34 is gripped naturally with one hand. The second hand squeezes the side of the reservoir bottle, pumping fluid through the tubes 24 and 11. The pinhole vent 21 is next uncovered and then the second hand releases the reservoir sides which spring back into their original position which pulls air in through the vent 21. Then vent 21 is covered with a thumb and the steps repeated until the supply tubes 11 and 24 are filled and the system is completely primed.

Alternative reservoir shapes are also possible, as are various cap and tubing arrangements. Reservoir openings may be receptive to a beveled stopper assembly (not shown), or may be threaded 19 to accept the threaded 20 lid assembly or cap 17 as depicted in FIG. 7.

All reservoir embodiments further may be translucent and marked 18 along the outer sides to provide an easy reference range for maintaining the fluid supply within desired parameters. In addition, if so marked, a reservoir 12 could also easily be used for mixing concentrated nutrients with water to provide the correct proportions for any given plant as desired.

As illustrated in FIG. 7, the cap 17 to the jug 12 may be provided with a vent opening 21 and an outer nipple 14 whereby the transport conduit 11 may be affixed in a manner similar to the connection between the transport tubing 11 and the tip of the smooth shank 6 opposite from the delivery tip 2 of the injection nozzle 10. Alternatively, the cap may be provided with a hole filled with a rubber grommet sized so that the transport tubing 11 will fit snugly through the center hole of the grommet and reach well into the reservoir 12, with the microporous filter 25 attached at the end of the tubing 11. The vent openings 21 can further be provided with a simple check valve 22 and the cap 17 provided with a sealing gasket member 23. If so configured if the fluid reservoir 12 is overturned no fluid will escape. This is desireable because of the expected application to Christmas trees, which are attractive to small children and pets and thus likely to be overturned.

The cross sectional view of the screw cap 17 depicted in FIG. 7 illustrates the outer nipple 14 at the top for connection to the transport tubing 11, and further illustrates in cross section an inner nipple 15 on the under side of the cap 17 for connection to a pick-up tube 24 which runs from the cap to the bottom of the container 12. Also illustrated in cross section in FIG. 7 is a microporous filter element 13 whose function has been previously described.

The microporous filter element 13 may be formed of porous molded plastic with pores of 45 microns. Representative examples are manufactured by Ginger Products for use in the practice of medicine, and for use as an aquarium airstone. The filter 25 is removably connected to the pick-up tube 24, so that it may be removed and back flushed to clear the filter, after which it is reinstalled.

Figure 8:
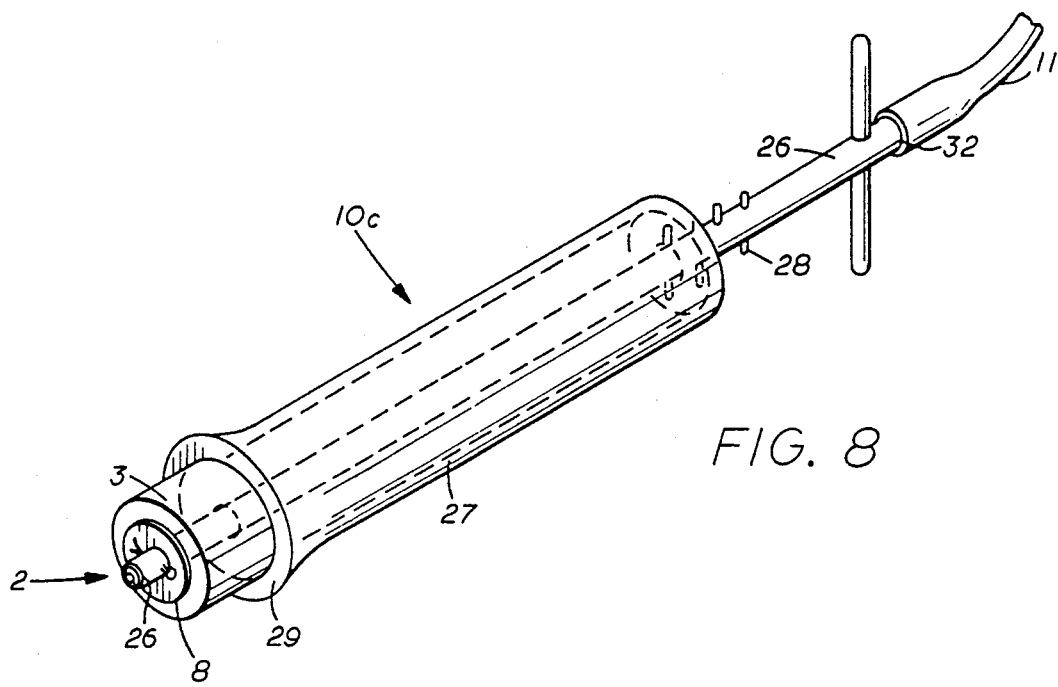
FIG. 8 is a perspective view of an alternative embodiment of the sealing injection nozzle of the present invention.
Figure 9:
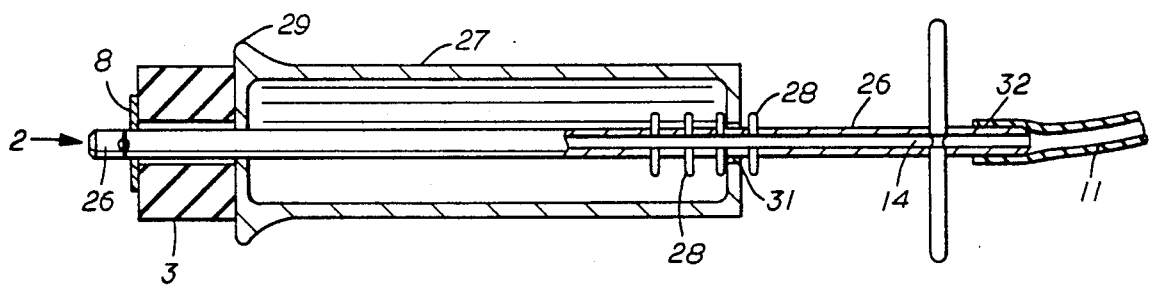
FIG. 9 is a cross section through FIG. 8.
Figure 10:
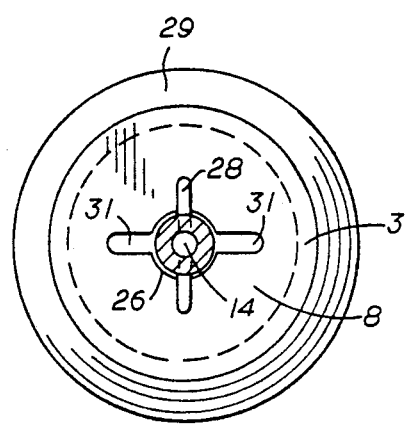
FIG. 10 is an end view of the embodiment illustrated in FIGS. 8 and 9.

Another alternative embodiment of the injection nozzle 10c is illustrated in FIGS. 8 through 10. Referring to FIG. 6, a perspective view of the alternative embodiment, there is illustrated a hollow core plunger stem 26, a carrier tube 27, and locking lugs 28. The delivery tip head 2 may be formed in a similar manner to that of the previous embodiments 10(a) and 10(b), with a bushing 3 and flat washers 8. Otherwise this embodiment is similar to the barrel and piston plunger of a hypodermic syringe. As the hollow core plunger 26 is pulled from the carrier tube 27, the delivery tip head 2 compresses the bushing 3 which bears against the flat washer 8, held in place by pin 36 or spring clip fitted appropriately at the injection end of the hollow core stem 26. The washer 8 in turn bears against a buttress 29 formed from the end of the carrier tube 27 at the delivery end of the nozzle 10c. As can be observed by a study of FIGS. 8 through 10, as the plunger stem 26 is pulled to pull the plunger through the carrier tube 27, the lugs 28 are pulled through slots 31 provided in the opposite end of the carrier tube from the buttress 29. Lock lugs 28 are disposed along the stem 26 in sufficient number to provide a range of compression so that the bushing 3 can expand circumferencially when compressed longitudinally to fill the aperture provided in a plant stem or tree trunk as previously described. Once the bushing 3 has expanded sufficiently to substantially hermetically seal the injection nozzle 10 within the aperture, the hollow core plunger stem 26 or barrel 27 is rotated, in either direction, clockwise or counter-clockwise, to cause the lugs 28 to be out of alignment with the slots 31, where upon when the plunger stem 26 is released, the lugs 29 will bear against the cap end 30 of the carrier tube or barrel 27 and be held in position by the resistance to compression of the bushing 3, as illustrated in FIGS. 8 through 10.

In this manner the injection nozzle embodiment 10(c) seals the aperture provided into a plant stem or tree trunk. The connection to the remainder of the apparatus of the present invention would be carried out in a similar manner to that described in for embodiments 10(a) and 10(b). The transport conduit or tube 11 would simply slip onto a nipple 32 provided at the extreme end of the hollow core plunger stem 26, as illustrated in FIG. 6.

Although a primary embodiment is illustrated in FIG. 4, it should be recognized that there are numerous arrangements for the installation of nozzles 10 within tree trunks or plant stems. FIG. 4 illustrates two intersecting holes 33 drilled completely through the trunk of a tree to double the number of capillaries open to fluid provided by the injection nozzle. Only one injection nozzle is utilized, the remaining three openings are plugged with "blind" versions of the invention 37, for example, identical to the nozzle of FIG. 1, except the bolt would have a solid shaft. Blind nozzles 37 are used to facilitate installation. The holes can then always be drilled completely through the tree trunk, without requiring a gauge to prevent over drilling. In practice a single bore 33, one blind stopper 37 and one injection nozzle 10 will normally suffice.

As to the manner of operation and use of the present invention, the same is made apparent from the foregoing discussion. With respect to the above description, it is to be realized that the optimum dimension relationships for the parts of the invention are to include variations in size, materials, shape, form, function and manner of operation, assembly and use, are deemed readily apparent to one skilled in the art, and all equivalent relationships to those illustrated in the drawings and encompassed in the specification are intended to be encompassed by the present invention.

Therefore, the foregoing is considered as illustrative of the principles of the invention, exemplifying any kind of compressible sealing material for the bushing, or any kind of microporous filter element, natural or artificial, not incompatible with the fluids to be introduced into a plant. Further, since numerous modifications will readily occur to those skilled in the art, it is not desired to limit the invention to the exact construction and operation shown or described, and all suitable modifications and equivalents may be resorted to, falling within the scope of the invention.

What is claimed as being new and desired to be protected by United States Letters Patent is as follows:

1. An apparatus for maintaining plant life by supplying water and nutrients to a plant severed from its root system comprising:
   (a) an injection nozzle adapted at one point to introduce fluids into a plant by insertion into and through an opening of a bore made through the outer plant layers into the inner sap carrying layers and adapted at a second point for connection to a fluid conduit wherein said nozzle is provided with expandable means for substantially hermetic sealing and releasing connection where said nozzle is inserted; and,
   (b) a flexible fluid conduit adapted at one end for connection to a microporous filter situated within a remotely positioned holding vessel for said water and nutrients, and adapted at the other end for connection to the injection nozzle.

2. The invention of claim 1 wherein:
(a) the holding vessel comprises a contiguously molded translucent plastic cylinder with a cut away section at one end wherein is formed a handle molded contiguously with the vessel;
(b) said entry port comprises a circular opening provided with a threaded neck molded during the process of forming of said reservoir;
(c) said fluid exit port comprises a thickened reservoir wall section near the entry port and tubing nipples adapted for sealing connection with said fluid conduit tubing nipples, one inside said reservoir and one outside said reservoir, and further wherein said thickened wall section and nipples are provided with an aperture through said outside nipple through said thickened wall section, and through said inside nipple to provide a fluid passageway from the inside of said reservoir to the outside of said reservoir; and,
(d) a pinhole vent at the apex of said handle and a threaded cap with a sealing gasket member fashioned threaded sealing connection with said threaded neck opening.

3. The invention of claim 1 wherein said injection nozzle comprises:
(a) a rigid barrel member with a buttress at a first end provided with an axial aperture through said buttress and a slotted aperture at the second end;
(b) a hollow core plunger passing through said axial aperture, extending through said barrel and out through said slotted end, with a grip at said slot end and with stops along the length of the stem proportioned so as to pass through said slots at said second end of said barrel when positioned correctly;
(c) an annular elastomeric compression member fitted around said hollow core plunger stem at the first end of said barrel member and adjacent to said buttress at said first end of said barrel member; and,
(d) retaining means at the second end of said hollow core plunger stem for retaining said annular member upon said hollow core stem.

4. The invention of claim 3 further wherein:
(a) said holding vessel comprises a contiguously molded translucent plastic cylinder with a cut away section at one end wherein is formed a handle molded contiguously with said vessel;
(b) said entry port comprises a circular opening provided with a threaded neck molded during the process of forming of said reservoir;
(c) said fluid exit port comprises a thickened reservoir wall section near said entry port and two tubing nipples adapted for sealing connection with said fluid conduit, one inside said reservoir and one outside said reservoir, and further wherein said thickened wall section and nipples are provided with an aperture through said outside nipple through said thickened wall section, and through said inside nipple to provide a fluid passageway from the inside of said reservoir to the outside of said reservoir; and,
(d) a pinhole vent at the apex of said handle and a threaded cap with a sealing gasket member fashioned threaded sealing connection with said threaded neck opening.

5. An apparatus for maintaining the life of a plant severed from its root system by supplying water and nutrients to the plant comprising:
(a) an injection nozzle adapted at one point to introduce fluids into a plant by insertion into and through an opening of a bore made through the outer plant layers into the inner sap carrying layers to make releasable sealing connection thereto, and adapted at a second point for connection to a fluid conduit wherein said nozzle comprises:
  (i) a corrosion resistant threaded hollow shank bolt which is provided with a non-threaded smooth shank tip at the opposite end of said bolt from the head of said bolt;
  (ii) at least one elastomeric annular compression member fitted around the threaded shank of said bolt adjacent said head of said bolt;
  (iii) at least one annular spacing means mounted upon the shank of said bolt;
  (iv) at least one elastomeric annular compression member mounted to the shank of said bolt intermediate said head and said spacing means; and,
  (vii) a wing nut adapted for threaded connection with the threads of said bolt,
(b) a remotely positioned contiguously molded plastic holding vessel for said water and nutrients comprising;
  (i) gauging means,
  (ii) handling means,
  (iii) entry port means for sealing said vessel with said fluids and nutrients,
  (iv) exit port means for cooperation with aid flexible fluid conduit to provide a continuous flow path from said holding vessel through said flexible conduit, and through said injection nozzle means into said bore, and
  (v) priming means for priming said fluid conduit injection nozzle system and for permitting retention of said priming until said system is in operation.
(c) a microporous filter situated within said holding vessel; and,
(d) a flexible fluid conduit adapted at one end for connection to said microporous filter and adapted at the other end for connection to said smooth shank tip to provide fluid supply means.

6. The invention of claim 5 further comprising:
(a) a second annular elastomeric compression member fitted around the shank of said bolt opposite relative to the head of said bolt from said first rigid annular sleeve, and a second annular rigid sleeve fitted around the shank of said bolt interposed and between said second elastomeric compression member and said wing nut.

7. The invention of claim 5 further comprising a flat washer fitted around the shank of said bolt and interposed between said annular elastomeric member and said wing nut.

8. The invention of claim 5 further comprising at least one blind sealing nozzle adapted to seal off any opening resulting from any bore drilled completely through the lower extremity of a tree.

9. The invention of claim 5 wherein:
(a) the holding vessel comprises a contiguously molded plastic vessel including gauging means and handling means and entry port means for filling said vessel with said fluids and nutrients, and exit port means for cooperation with said flexible fluid conduit to provide a continuous flow path from said holding vessel through said flexible conduit through said injection nozzle means into said bore or bores, and priming means permitting priming of said fluid conduit and injection nozzle system and for permitting retention of said priming until the system is in operation.

10. A method for maintaining the life of a plant severed from its root system by supplying water and nutrients to the plant comprising:
   (a) making at least one bore through the outer plant layers into the inner sap carrying layers, and introducing an injection nozzle into and through the opening of said bore wherein said injection nozzle is provided with a mechanical substantially hermetic releasable seal;
   (b) attaching a flexible fluid conduit at one point to the injection nozzle and attaching the opposite end of the fluid conduit to a microporous filter within a remotely positioned supply holding vessel for said fluid and nutrients; and,
   (c) filling said holding vessel to the appropriate level with fluids and nutrients, and maintaining the level of fluids and nutrients within the holding vessel within the appropriate range.

11. A method for maintaining the life of a tree severed from its root system by supplying water and nutrients to the plant comprising:
   (a) making a first bore into the trunk of said tree through the outer plant layers, then drilling at least one additional intersecting bore to said first bore;
   (b) introducing the injection nozzle into a first bore opening;
   (c) installing blind sealing nozzle members into any remaining bore openings;
   (d) attaching a flexible fluid conduit in fluid communication to the injection nozzle and attaching the opposite end of the fluid conduit in fluid communication to a microporous filter within a remotely positioned supply holding vessel for said fluid and nutrients to form a fluid supply means;
   (e) running said fluid conduit means through exit port means provided on said holding vessel to form a continuous fluid path from said microporous filter within said reservoir to said injection nozzle;
   (f) filling said supply vessel to the desired level with fluid and nutrients through a filling port provided on said supply vessel and sealing said filling port with filling port sealing means;
   (g) priming said fluid supply means to remove air and insure that fluids and nutrients are supplied to said nozzle and said bores.

* * * * *